United States Patent [19]

Gray

[11] Patent Number: 4,925,151
[45] Date of Patent: May 15, 1990

[54] APPARATUS FOR MOLDING TWO-TONE COLORED PLASTIC SHELLS

[75] Inventor: John D. Gray, New Durham, N.H.

[73] Assignee: Davidson Textron Inc., Dover, N.H.

[21] Appl. No.: 354,915

[22] Filed: May 22, 1989

Related U.S. Application Data

[63] Continuation of Ser. No. 185,485, Apr. 25, 1988, abandoned.

[51] Int. Cl.$^5$ .................. B29C 41/04; B29C 41/22
[52] U.S. Cl. ...................... 249/65; 249/160; 249/168; 264/245; 264/310; 264/DIG. 60; 425/425; 425/434; 425/435; 425/DIG. 47
[58] Field of Search .......... 264/245, 310, 311, 313, 264/255, DIG. 60, 250, 302; 249/65, 55, 160, 168; 425/425-435, DIG. 14, DIG. 47

[56] References Cited

U.S. PATENT DOCUMENTS

| | | | |
|---|---|---|---|
| 2,841,823 | 7/1958 | Van Hartesveldt | 249/65 |
| 2,939,299 | 6/1960 | Sherbloom | 249/55 |
| 3,123,403 | 3/1964 | Hood | 264/46.6 |
| 3,999,930 | 12/1976 | Telbizoff | 425/394 |
| 4,562,025 | 12/1985 | Gray | 425/434 |
| 4,610,620 | 9/1986 | Gray | 425/434 |
| 4,623,503 | 11/1986 | Anestis et al. | 264/302 |
| 4,724,113 | 2/1988 | Lee | 249/65 |
| 4,783,302 | 11/1988 | Kurimoto | 264/245 |

FOREIGN PATENT DOCUMENTS

| | | | |
|---|---|---|---|
| 55-123423 | 9/1980 | Japan | 249/65 |
| 59-156710 | 9/1984 | Japan | 264/260 |
| 87/04973 | 8/1987 | PCT Int'l Appl. | 249/65 |

*Primary Examiner*—Jeffery Thurlow
*Assistant Examiner*—Mathieu Vargot
*Attorney, Agent, or Firm*—John C. Evans

[57] ABSTRACT

Apparatus for manufacturing thin-walled hollow shells for parts such as automobile door panels, control and instrument panels and the like includes a charge box or powder box for supplying dry thermoplastic material to separate casting surfaces on a heated mold selectively connected to the charge box during a casting process. A selectively pressurizable inflatable seal gasket is connected to the charge box for sealing a division surface on the heated mold which surface separates the casting surfaces of the mold. The inflatable seal gasket includes a base portion fixed to the charge box; an inflatable core with expandable walls to bridge the distance between the charge box and the division surface and a seal bead that sealingly engages the division surface when the seal gasket is inflated to keep the division surface clean for a subsequent application of material to form a connector bond between previously cast two tone colored segments.

10 Claims, 2 Drawing Sheets

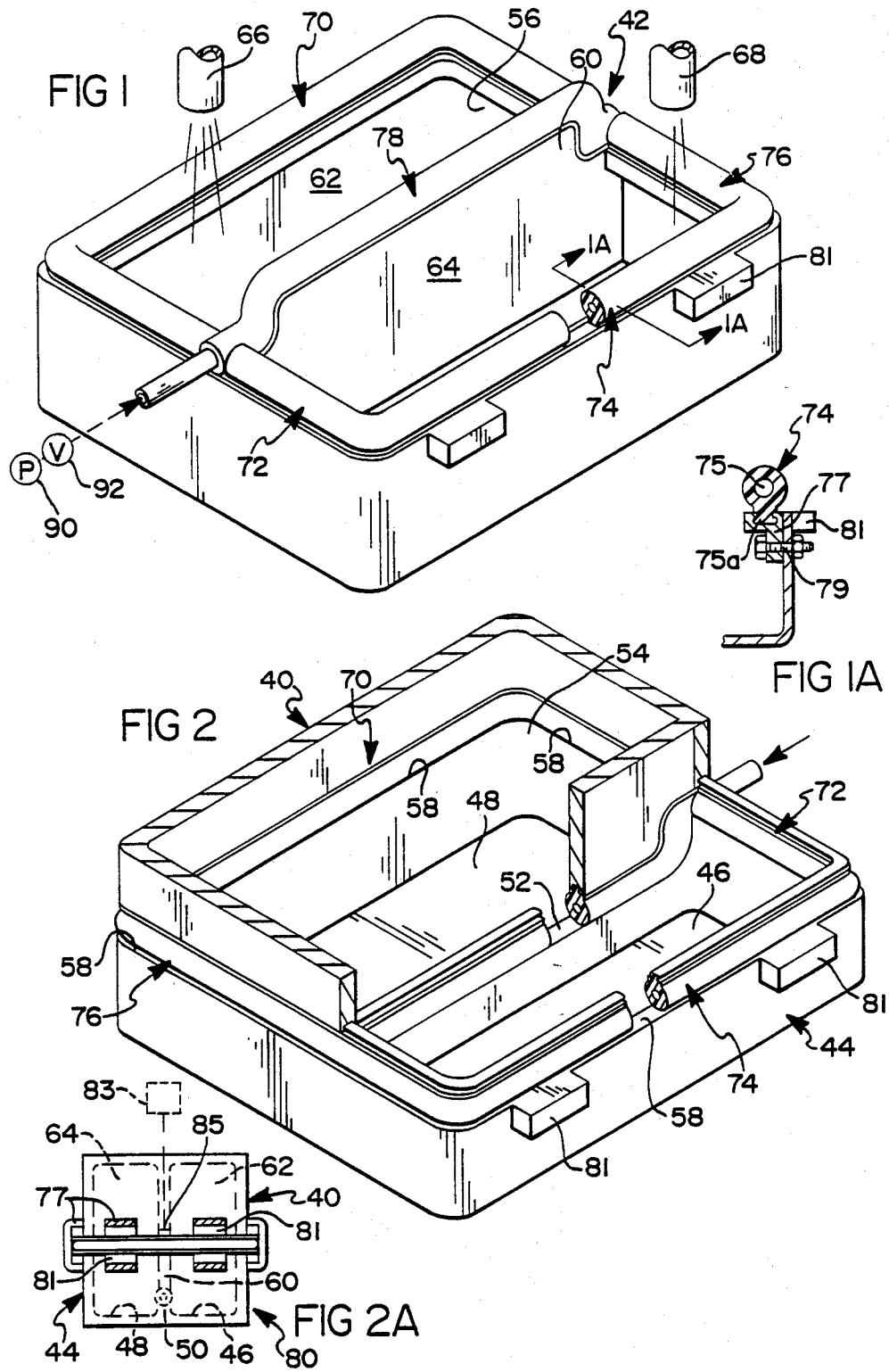

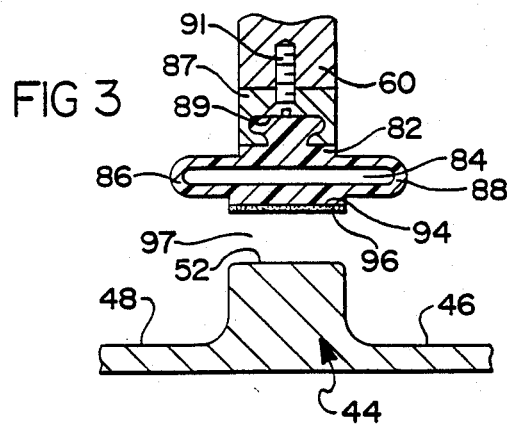
FIG 3
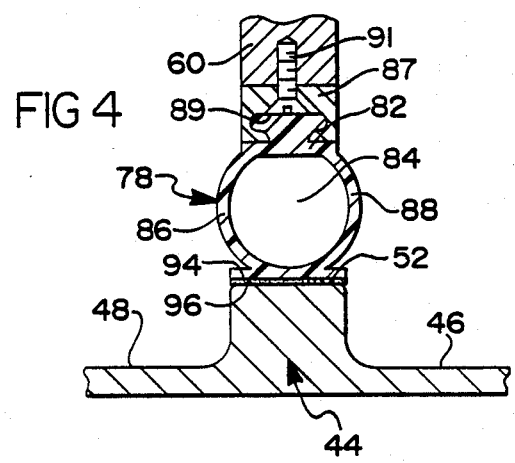
FIG 4
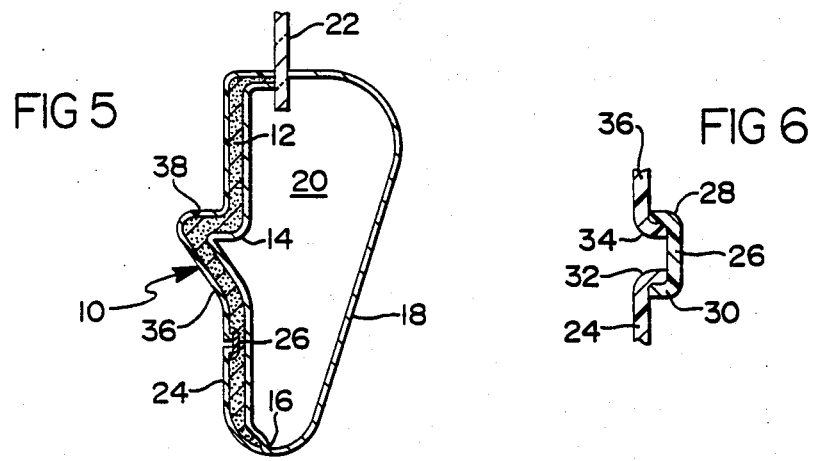
FIG 5
FIG 6

APPARATUS FOR MOLDING TWO-TONE COLORED PLASTIC SHELLS

This is a continuation of Ser. No. 185,485, filed 4/25/88, now abandoned.

TECHNICAL FIELD

This invention pertains to apparatus for making thin plastic shells especially suitable for use in automobile trim components such as interior door or instrument panels and more particularly to two-tone plastic shells having an integrally bonded connector joining the color sections at a bond joint therebetween.

BACKGROUND ART

The automotive industry has turned to the use of interior trim components such as door panels comprising a polyvinyl chloride shell. See, for example, the trim components disclosed in U.S. Pat. No. 3,123,403. The acceptance of such components has been because inter alia this type of construction permits a wide latitude in styling and color, and grain effects which are most desired, particularly in the interior design of automobiles.

The current state of the art includes a preformed grained vinyl shell made from dry thermoplastic powder particles which are applied to a heated shell mold from a powder box to form a continuous one piece shell.

In order to enhance the interior decor of an automobile, interior door panels and other parts have been prepared which include two separate plastic shell sections joined by a mechanical fastener.

U.S. Pat. No. 4,562,025, issued Dec. 31, 1985, with a common assignee to the present application, covers a Mold Method and Apparatus for Multi-Color Plastic Shells in which shell segments have their edges bonded at a common break-line.

U.S. Pat. No. 4,610,620 issued Sept. 9, 1986 discloses apparatus for loading and releasing a precharge of two or more colors of thermoplastic powder from separate compartments in a charge box means for gravity flow into a mold configured to produce two shell segments and a separate overlapping color connector to bond the shell segments to form a one piece shell with two or more color tones to enhance the decor of the interior of an automobile.

In the '620 patent, an open-ended charge box means is provided with a divider wall to form two or more separate compartments, each filled with a predetermined quantity of different colored powder. The mold has a division surface which cooperates with the divider wall to separate the powder content in each compartment of the charge box means. The charge box releases the powder from the separate charge box compartments to flow evenly across the open end of the mold by gravity. A fixed gasket seals the division surface and the divider wall so as to produce separate two tone segments on the heated surfaces of the mold. In theory, the seal gasket keeps the division surface clean for a subsequent application of material thereagainst to form a connector that bonds the previously cast two tone segments to form a single piece article with an integral joint between two tone segments. In practice, such a fixed gasket must conform to a division surface on each of a number of heated molds. The molds can be heated by suitable means such as hot air units of the type shown in U.S. Pat. No. 4,623,503 dated Nov. 18, 1986. Tolerance differences in the mold dimensions may leave margin gaps between the fixed gasket and the division surface. Powder from the charge box can seep into such gaps onto the division surface to create color smudges in the finish bonded connector.

STATEMENT OF INVENTION AND ADVANTAGES

Accordingly, an object of the present invention is to provide apparatus which solves the problem of powder particle seepage across a division surface in apparatus for molding a two tone colored thin-walled plastic shell. Such apparatus includes the provision of an inflatable seal means on a charge box including inflatable means therein operative to selectively bridge between a divider wall and the division surface when a charge box and heated mold are connected together. The inflatable seal means includes a sealing bead thereon configured to completely cover the sealing surface and to seal the division surface to prevent seepage of material from the casting surfaces to the division surface and to prevent resultant color smudges in a subsequently formed connector bond.

A further object of the invention is to provide apparatus of the preceding object wherein the inflatable seal means includes a base segment bonded to the powder box divider wall and a hollow core member connected to the sealing bead.

Another feature of the invention is to prevent seepage and color smudging by providing inflatable sealing means having a sealing bead with spaced parallel side edges bounding an area congruent with the surface area of the division surface.

Another feature of the present invention is to prevent seepage and subsequent connector bond color smudging by providing a positive seal action by including an inflatable core segment with walls that expand to locate the sealing bead in pressure sealed engagement with the division surface.

Still another feature of the present invention is to prevent such seepage and color smudging by the provision of a charge box having a divider wall extending beyond the side walls thereof and having a length beyond the side walls slightly less then the maximum dimension depth of a heated mold connected thereto at the division surface thereon and by providing an inflatable seal means with an expanded length when inflated which, combined with the length of the divider wall, is greater than the maximum dimension depth of the heated mold connected thereto at the division surface thereon.

Other advantages and a more complete understanding of the invention will be apparent to those skilled in the art from the succeeding detailed description of the invention and the accompanying drawings thereof.

BRIEF DESCRIPTION OF THE DRAWINGS

FIG. 1 is a perspective view of a charge box and seal assembly of the inventive apparatus;

FIG. 1A is a fragmentary sectional view of a compression seal in the assembly of FIG. 1 along line 1A—1A looking in the direction of the arrows;

FIG. 2 is a perspective view of a mold of the invention sealed by the charge box of FIG. 1;

FIG. 2A is a diagrammatic view of the joined charge box and mold of FIGS. 1 and 2;

FIG. 3 is a sectional view showing the box and seal assembly in a deflated position;

FIG. 4 is a sectional view of the seal assembly in an inflated position;

FIG. 5 is a view of a part made by use of the present invention; and

FIG. 6 is an enlarged sectional view of a bonded connector portion of the part shown in FIG. 5.

DETAILED DESCRIPTION OF THE INVENTION

In accordance with the present invention, hollow shell parts of a variety of forms can be processed. For illustrative purposes, FIG. 5 shows a typical automobile door panel application of a multi-color, single piece interior plastic shell 10. The apparatus of the present invention, however, is equally suitable for making other interior parts such as instrument panel covers and the like. The shell 10, preferably made of polyvinyl chloride material. It is backed by a layer of polyurethane foam 12 bonded to the shell 10 by a mold process such as in U.S. Pat. No. 3,123,403, issued Mar. 3, 1964 for automobile Arm Rest. An interior reinforcing insert 14 is connected at a joint 16 to an outer door panel 18 to form an interior space 20 for a window lift mechanism (not illustrated) to raise and lower a window 22.

The shell is a one piece plastic part with an integral lower panel 24 of a dry castable thermoplastic material of a first color. As best seen in FIG. 6, the shell 10 includes a bonded connector 26 of a selected connector color that has edges 28 and 30 that overlap and are bonded to an edge 32 of the lower panel 24 and a side edge 34 of an upper panel 36 including an armrest segment 38 formed by a dry castable thermoplastic material having a second color contrasting or complementing the color of the lower panel 24 or other interior components. For example, the upper panel can be red, blue, yellow or beige to contrast with or complement the interior color of seats, headliners, crashpads and the like. The lower panel 24 can be colored a deeper complementary two tone color of a character which has a low impact or scuff resistant qualities. The bonded connector can be a color complimentary to the colors of lower panel 24 and upper panel 36 or the same as one or the other of the panels.

The apparatus of the present invention, shown in FIGS. 1-4, includes a charge or powder box 40 with a seal assembly 42. Each of the heated molds 44 is selectively coupled to the powder box 40 once the mold has been heated to a casting temperature by suitable heating means.

The heated mold 44 more particularly includes a pair of casting surfaces 46, 48 separated by a raised rib 50 therebetween. The rib 50 has a division surface 52 that extends between spaced sidewalls 54, 56 of the mold 44.

The rib 50 is located below the upper edge surfaces 58 of the walls of the mold. In the illustrated example of the invention the upper edge surfaces 58 are shown in the same plane. It should be understood that these surfaces may be at different levels depending upon the shape of the thin walled shell to be cast onto the heated mold.

The charge box 40, shown in FIG. 1, includes a divider wall 60 which separates the box 40 into first and second compartments 62, 64 each of which is configured to be filled with a charge of thermoplastic particles. In FIG. 2, a fragmentary section of the charge box 40 is shown on the mold 42 to illustrate the relationship thereto during the casting process. The charge in the box 40 is a dry thermoplastic material which will melt and bond together when cast against the heated surfaces 46, 48 of the mold 44. In order to maintain separation between the material in each of the compartments 62, 64, the height of divider wall 60 is greater than the maximum depth of either of the compartments 62, 64. The compartments 62, 64 are filled from diagrammatically illustrated sources 66, 68 of different colors of thermoplastic material.

The charge box 40 further includes side wall gaskets 70-76. As shown in FIG. 1A, each gasket 70-76 has a compression seal segment 75 with a base 75a slidably received for replacement in an extruded retainer 77 connected to the box by suitable fasteners (shown as bolts 79). The gaskets 70-76 seal the perimeter of the charge box 40 to the perimeter of the heated mold 44 when they are clamped together at outwardly directed wall flanges 81 as shown in FIG. 2A by clamps 77.

An inflatable seal 78 is provided on the divider wall 60 to seal the division surface 52 and to compensate for dimensional tolerance differences between different mold/powder box combinations to assure a positive seal against migration of different color materials from surfce 46 to surface 48.

Once the powder box 40 and mold 42 are clamped together, the side wall seals 70-76 prevent the escape of material from a closed casting system 80 which is rotated by drive means 83 about an axis of rotation 85 to distribute a layer of first and second colored particles of thermoplastic material on the surfaces 46 and 48. The seal 78 is inflated during such casting to prevent flow of different colored particles between compartments 62, 64 and onto the division surface 52.

The inflatable seal 78 is configured (see FIGS. 3, 4) to accomplish several objectives. First, it has a base 82 connected to the divider wall 60 by a retainer 87 in fixed sealing engagement therewith to seal along the length thereof and to provide a structural base for operation between deflated and inflated positions. The retainer 87 has a dovetail groove 89 to receive the base 82 of the seal 78. A suitable screw fastener 91 holds the retainer in place on the wall 60.

The seal 78 also has a hollow core 84 with walls 86, 88 which expand and contract when the core 84 is inflated. Such inflation occurs when the core 84 is selectively connected to a source of pressure 90 by suitable valve control means 92. Third, it has a sealing bead 94 which is selectively held in pressure biased sealing relationship with the division surface 52 during a casting operation.

The sealing bead 94, more particularly, has a surface 96 thereon which completely covers the division surface 52 when the seal 78 is inflated. Consequently, there are no edge gaps for seepage of material from either of the compartments 62, 64 onto the surface 52 during the casting operation.

FIG. 3 shows the seal 78 in its deflated (retracted) position. A gap 97 remains between the sealing bead 94 and the division surface 52 when the seal 78 is deflated. In order to bridge the gap and compensate for dimensional tolerance differences in the height of the rib 44 on different molds, the hollow core 84 is pressurizable to expand the walls 86, 88. FIG. 4 shows the inflatable seal 78 in its inflated (expanded) position in which the sealing bead 94 is sealingly located on the surface 52.

The division surface 52 remains covered during the casting process. Consequently, it is clean when the mold 42 is separated from the powder box 44. Following such casting operation, a thin layer of material is formed on each casting surface to form separate colored segments such as panels 24 and 36 described above.

A separate bonding layer of thermoplastic material is then applied to the surface 52 in a known manner by suitable means including painting or rolling a wet slurry of a suitable thermoplastic material or by dry casting the bonding thereon. A resultant bonded connector 26, shown in FIG. 6, is thus formed to bridge the gap between the colored segments 24, 36 and to bond the segments into one integral part with a precision styling line therebetween while the segments remain in the mold. The final product is removed from the mold as an integral unit.

A typical powder casting process for a two color door panel includes the following sequence.
1. Preheat mold tool.
2. Attach the powder box to the mold when it attains casting temperature to melt the thermoplastic material.
3. Rotate charge box and mold to form separate cast segments of two tone colors.
4. Dwell period.
5. Unclamp.
6. Distribute connector bond material against clean, heated division surface.
7. Return the mold to a cure oven (or it is heated by hot air flow in a hot air processing unit) to fuse connector and two tone segments.

Further description of such a process is set forth in the aforementioned '620 patent. Suitable thermoplastic casting material include plasticized polyvinyl chlorides and related vinyl resins in dry powder form or in liquid slurry form for ease of gravity flow from the powder charge box during the casting steps. Typical examples of parts, plastic materials and mold processes include the following:

PVC resin, plasticizer, stabilizer, release agents and color pigments are combined in a high intensity mixer to produce a dry, flowable powder of each desired color. The process is known in the industry as dry-blending.

The various compound constituents may be selected as to type and ratio to provide the properties required both for the finished product and for ease of processing. Physical properties will not be too dissimilar from those obtained with liquid plastisol which is also used to manufacture similar products but has an inherent tendency to form objectionable drips and runs when used to make complex shapes.

Processing properties are such that when melting of the plastic powder occurs, densification results in exact reproduction of minute detail such as grain marks and stitches engraved in the mold surface.

Mold preheating temperature may range from 250° F. to 450° F. Since the thickness of the finished product is also governed by the time the powder contacts the mold, it should be understood that simultaneous charging of the powder to the mold can be of definite advantage. Also, if certain areas of the mold can be made to have a lower preheated temperature than others, it will permit molding a thinner shell in those areas, since both temperature and mold-filled time determine the final thickness of the shell. Therefore, a very flexible range, for mold-filled time, of one second to ten seconds or more has been established.

Depending on formulation, complete melting or fusion of the PVC powder can occur when mold temperatures read 350° F. to 450° F.

After fusion, the mold is cooled to a temperature which will facilitate removal of the shell without damage.

Specifically, the process and apparatus of the present invention provides even and complete distribution of thermoplastic powder material onto mold surfaces to form large, long, thin walled, single piece, two color or more shells with a pin stripe or common color connector bonded to each shell segment for forming a unitary part for interior door panels or instrument panels and the like formed during short cycle mold cycles in limited plant floor space.

While representative embodiments of apparatus and process of the present invention have been shown and discussed, those skilled in the art will recognize that various changes and modifications may be made within the scope and equivalency range of the present invention.

What is claimed is:
1. Apparatus for molding a two tone colored, thin walled plastic shell including a heated mold and a powder charge box connected to the heated mold and seal means between said powder charge box and said heated mold to define a first powder casting surface on said heated mold for forming a shell of one color and to define a second powder casting surface on said heated mold forming a shell of another color comprising:
a divider wall and a perimeter wall on said powder charge box for separating said powder charge box into first and second chambers;
said divider wall having a horizontal surface and a vertical end surface on either end of said horizontal surface;
said heated mold having a perimeter wall generally congruent with said perimeter wall of said powder charge box; said perimeter wall of said heated mold horizontally spaced from each of said vertical end surfaces to form a gap therebetween; said heated mold further having a rib with a horizontal surface raised above the first and second powder casting surfaces, said horizontal surface located a fixed vertical distance from said horizontal surface of said divider wall;
a first seal member carried on said divider wall having a base segment secured to said horizontal and vertical end surfaces of said divider wall; a sealing bead surface on said first seal member having a first seal bead portion extending across the full length of said horizontal surface and having second and third seal bead portions extending across the full lengths of said vertical end surfaces; and a hollow, yieldable core on said first seal member connected to said base segment and to said sealing bead surface; said yieldable core expandable vertically to cause said first seal bead portion to bridge the fixed vertical distance between said horizontal surface on said rib and said horizontal surface of said divider wall to seal therebetween; said yieldable core expandable horizontally to cause said second and third seal bead portions to bridge the gap between the vertical end surfaces of said divider wall and said heated mold to seal therebetween;
a second seal member carried on said perimeter wall of said powder charge box; said second seal member having a hollow core compressible against said perimeter wall of said heated mold when the powder box is connected to said heated mold;

said hollow yieldable core of said first seal member having a vertically flattened position with a width greater than the width of said horizontal surface of said rib when deflated and a vertically expanded position when inflated with a width which is substantially the same as the width of said horizontal surface of said rib;

means for selectively inflating and deflating said hollow yieldable core of said first seal member from its vertically flattened position to said vertically expanded position and operative when the powder charge box is connected to said heated mold to cause said first seal member to inflate so as to cause said sealing bead surface to fully cover said horizontal surface of said rib without horizontally overlying the powder casting surfaces;

said means for selectively inflating and deflating said hollow yieldable core of said first seal member operative to deflate said hollow yieldable core to cause it to retract to its vertically flattened position while said second seal member expands following separation of said powder charge box and said heated mold upon formation of separated two tone color segments on said first and second casting surfaces so as to expose said horizontal surface of said rib for application of additional material thereagainst to form a connector bond between first and second color segments.

2. In the apparatus of claim 1, said second seal member including a base segment thereon connected to said perimeter wall of said powder charge box and a hollow core integrally connected to said base segment.

3. In the apparatus of claim 1, said first and second seal members having a sealing bead surface with spaced parallel side edges and a surface bounding an area congruent with the surface area of said horizontal surface of said rib and congruent with said perimeter walls of said heated mold and moveable into engagement therewith when said first seal member is vertically inflated.

4. In the apparatus of claim 1, said first and second seal members having a hollow core with walls that respectively expand and retract when said powder charge box is connected to said heated mold to locate said sealing bead surface of said first seal member in sealing engagement with said horizontal surface of said rib and said second seal member in sealing engagement with said perimeter walls of said heated mold.

5. In the apparatus of claim 2, said first and second seal members having a sealing bead with spaced parallel side edges bounding an area congruent with the surface area of said horizontal surface of said rib and said perimeter walls of said heated mold and moveable into engagement therewith by differential movement therebetween when said first seal member is inflated.

6. In the apparatus of claim 2, said first and second seal members having a hollow core with walls that respectively expand and contract to locate said sealing bead surface of said first seal member in sealing engagement with said horizontal surface of said rib and said second seal member in sealed engagement with the perimeter walls of said heated mold.

7. In the apparatus of claim 1, said powder charge box having a divider wall extending above the side walls thereof and having a depth greater than said side walls that is slightly less than the maximum depth of said heated mold connected thereto at said rib, the total height of said first seal member combined with the height of said divider wall being greater than the depth of the heated mold at said horizontal surface of said rib and the total height of said second seal member combined with the height of said perimeter walls of said powder charge box compressing said second seal member between said powder charge box and said heated mold when connected together.

8. In the apparatus of claim 7, said first and second seal members each having a hollow core with walls that respectively expand and retract when said powder charge box is connected to said heated mold to locate said sealing bead surface in sealing engagement with said horizontal surface of said rib and said second seal member against the perimeter walls of said heated mold.

9. In the apparatus of claim 8, said first and second seal members having a sealing bead surface with spaced parallel side edges bounding an area congruent with the surface area of said horizontal surface on said rib and said second seal member engageable with said perimeter walls of said heated mold and moveable into engagement therewith by differential movement therebetween when said first seal member is inflated.

10. In the apparatus of claim 7, said first and second seal members having a sealing bead surface with spaced parallel side edges bounding an area congruent with the surface area of said horizontal surface of said rib and said second seal member engageable with the perimeter walls of said heated mold and moveable into engagement therewith by differential movement between said first seal member and said second seal member when said first seal member is inflated and said second seal member engages said perimeter wall of said heated mold.

* * * * *